United States Patent [19]
Kidd

[11] 4,066,351
[45] Jan. 3, 1978

[54] VARIABLE ILLUMINATION OPTICAL SYSTEM

[75] Inventor: Wayne L. Kidd, Fairport, N.Y.

[73] Assignee: Xerox Corporation, Stamford, Conn.

[21] Appl. No.: 659,620

[22] Filed: Feb. 20, 1976

[51] Int. Cl.[2] ...................... G03G 15/01; G03B 27/76
[52] U.S. Cl. ...................................... 355/3 R; 355/4; 355/14; 355/69
[58] Field of Search ...................... 355/3 R, 8, 14, 69, 355/4

[56] References Cited

U.S. PATENT DOCUMENTS

| | | | |
|---|---|---|---|
| 3,120,790 | 2/1964 | Carlson et al. | 355/3 R |
| 3,580,671 | 5/1971 | Lavander | 355/3 R |
| 3,672,759 | 6/1972 | Bauer | 355/3 R |
| 3,815,992 | 6/1974 | Ogawa | 355/69 |
| 3,936,173 | 2/1976 | Kidd et al. | 355/3 R |
| 3,961,848 | 6/1976 | Turner | 355/4 |

*Primary Examiner*—Fred L. Braun
*Attorney, Agent, or Firm*—J. J. Ralabate; C. A. Green; H. Fleischer

[57] ABSTRACT

An optical system in which a screen modulates the light produced thereby. The intensity of the light image is varied as a function of screen position.

4 Claims, 3 Drawing Figures

VARIABLE ILLUMINATION OPTICAL SYSTEM

BACKGROUND OF THE INVENTION

This invention relates generally to an electrophotographic printing machine, and more particularly, concerns a control system for regulating the illumination intensity of the optical system as a function of the spacing between the screen and photoconductive surface.

As in all electrophotographic printing machines, the original document being reproduced is illuminated to form a light image thereof. The light image irradiates the charged portion of the photoconductive surface dissipating selectively the charge thereon to record thereon an electrostatic latent image. Heat settable particles develop the latent image. These particles are transferred to a sheet of support material, in image configuration. Thereafter, heat is applied to the particles permanently affixing them to the sheet of support material.

In the process of multi-color electrophotographic printing, a plurality of electrostatic latent images are recorded on the photoconductive member. Each latent image corresponds to a different color of the original document. Differently colored toner particles are utilized to develop the latent images. These particles are then transferred from the latent image to the sheet of support material, in superimposed registration with one another. The resultant multi-layered powder image is then permanently affixed to the sheet of support material by the application of heat thereto. In this manner, a color copy of the original document is formed.

An electrophotographic printing machine may be arranged to produce either a functional copy or a pictorial copy. A functional copy is a copy of a document wherein subtle variations of tone or color are not present, such as in a graph, chart, lines, etc. Pictorial quality copies are reproduced in electrophotographic printing machines by employing half tone imaging screens. These screens produce tone gradations by forming halftone dots or lines of varying sizes. The dots increase in size from the highlight regions throughout the intermediate shades until they merge together in the shadow regions. Numerous patents teach the concept of screening. Exemplary of these patents are U.S. Pat. Nos. 2,598,732; 3,535,036; 3,493,381;3,776,633; and 3,809,555. It has been found that the contrast of a pictorial copy may be regulated by adjusting the spacing between the photoconductive surface and the screen. A functional copy may be produced by removing the screen from the optical light path so that the light image is not modulated. Alternatively, the spacing may be increased to an optimum distance so as to defocus the screen member. Thus, by increasing the spacing between the screen member and photoconductive member a sufficient distance, the screen is de-focused and is ineffective. Typical systems for moving the screen relative to the photoconductive surface are described in copending application Ser. No. 566,872, filed Apr. 10, 1975, now U.S. Pat. No. 3,958,877, copending application Ser. No. 567,149, filed Apr. 11, 1975, now U.S. Pat. No. 3,961,848, and copending application Ser. No. 647,289, filed Jan. 7, 1976, now U.S. Pat. No. 4,025,181. However, the spacing between the screen and photoconductive surface also appears to affect the intensity of illumination irradiating the photoconductive surface.

Accordingly, it is a primary object of the present invention to improve the optical system of an electrophotographic printing machine by automatically adjusting the intensity of illumination as a function of the spacing between the screen and photoconductive surface.

SUMMARY OF THE INVENTION

Briefly stated, and in accordance with the present invention, there is provided an optical system for producing a modulated light image of an original document.

Pursuant to the features of the present invention, the optical system includes a screen member and a receiving member. Means are provided for projecting a light image of the original document through said screen member onto said receiving member. Adjusting means set the spacing between the screen member and receiving member. Controlling means, responsive to the spacing between the screen member and receiving member, regulate the intensity of the light image transmitted through the screen member by the projecting means.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
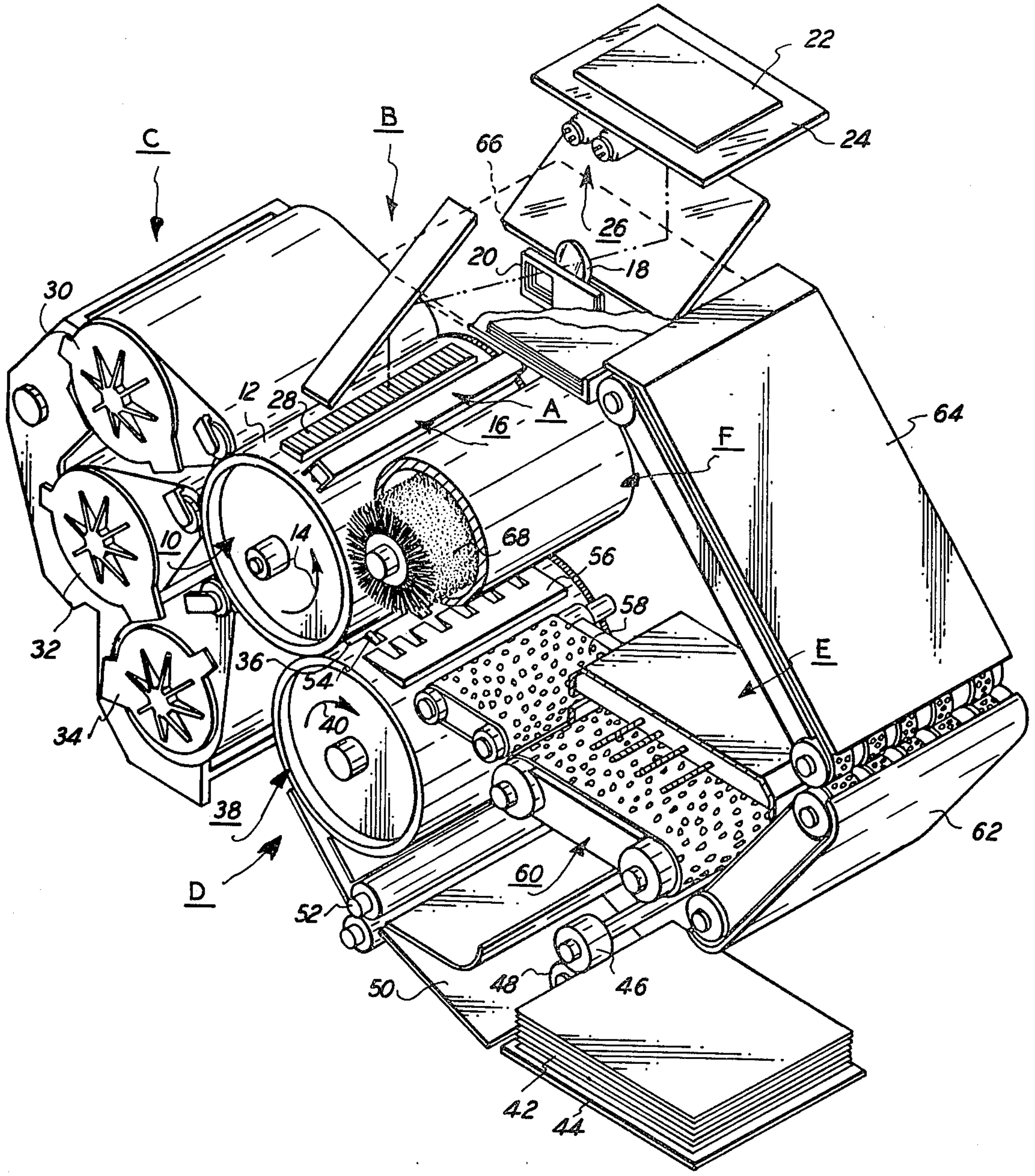
FIG. 1 is a schematic perspective view depicting an electrophotographic printing machine incorporating the features of the present invention thereof.

FIG. 1 depicts an electrophotographic printing machine incorporating the various features of the present invention therein. In all of the drawings, like reference numerals have been used throughout to designate identical elements. The printing machine of FIG. 1 reproduces original documents in the form of single sheets, books or three dimensional objects. While the apparatus of the present invention is particularly well adapted for use in the electrophotographic printing process, it will be evident from the following description that it may also have many other applications.

For purposes of the present disclosure, the various processing stations employed in the printing machine will be briefly described hereinafter.

With continued reference to FIG. 1, the electrophotographic printing machine includes a photoconductive member having a rotatable drum 10 with a photoconductive surface 12 entrained thereabout and secured thereto. Drum 10 is journaled for rotation on a suitable shaft (not shown) and rotates in the direction of arrow 14. In this way, photoconductive surface 12 moves sequentially through a series of processing stations. Preferably, photoconductive surface 12 is made from a suitable polychromatic selenium alloy such as is described in U.S. Pat. No. 3,655,377 issued to Sechak in 1972. A signal generator (not shown) rotates with drum 10. The signal generator produces a series of electrical pulses. These pulses activate the machine logic to provide an indication of the angular position of drum 10. In this manner, each processing station is energized at the appropriate time during the angular rotation of drum 10.

Initially, as drum 10 rotates in the direction of arrow 14, a portion of photoconductive surface 12 passes through charging station A. Charging station A includes a corona generating device, indicated generally by the reference numeral 16. Corona generator 16 charges the portion of photoconductive surface 12 passing beneath corona generating device 16 to a substantially uniform level. One type of suitable corona generating device is described in U.S. Pat. No. 3,875,407 issued to Hayne in 1975.

Thereafter, the charged portion of photoconductive surface 12 rotates to exposure station B. At exposure station B, a filtered image of the original document is projected onto the charged portion of photoconductive surface 12. A moving lens system, generally designated by the reference numeral 18, and a color filter mechanism, shown generally at 20, move in a timed relationship with drum 10 to scan successive incremental areas of original document 22 disposed upon transparent platen 24. Lamps 26, disposed beneath platen 24, illuminate successive incremental areas of original document 22. U.S. Pat. No. 3,062,108 issued to Mayo in 1952 described a suitable moving lens system. Similarly, U.S. Pat. No. 3,775,006 issued to Hartman et al. in 1973 discloses a suitable filter mechanism. A suitable type of lens is described in U.S. Pat. No. 3,592,531 issued to McCrobie in 1971. The foregoing elements cooperate with one another to produce a single color flowing light image of the original document. This single color light image is transmitted through screen member 28. Screen member 28 is mounted movably in the printing machine and interposed into the optical light path to modulate the single color light image irradiating the charged portion of photoconductive surface 12. In this manner, a modulated single color electrostatic latent image is recorded on photoconductive surface 12. In order to regulate the contrast of the resultant copy, the spacing between screen 28 and photoconductive surface 12 is adjustable. Moreover, if the printing machine is operating in the functional mode, i.e., wherein non-pictorial copies are being reproduced, the screen member may be spaced from photoconductive surface 12 a distance sufficient to de-focus the screen and render it inoperative. Under all of the foregoing circumstances, the intensity of the light rays produced by light source 28 must be suitably adjusted. The structure for moving screen member 28 relative to photoconductive surface 12 will be described hereinafter in greater detail with reference to FIG. 2. FIG. 3 depicts the control system for regulating the positioning of screen member 28 and controlling the intensity of illumination developed by light source 26 as a function thereof.

After the latent image is recorded on photoconductive surface 12, drum 10 rotates to development station C. At development station C, three individual developer units, generally indicated by the reference numerals 30, 32 and 34, respectively, render successive electrostatic latent images visible. A suitable development station employing three developer units for use in a color electrophotographic printing machine is described in U.S. Pat. No. 3,854,449 issued to Davidson in 1974. As disclosed therein, the developer units are all magnetic brush developer units. A typical magnetic brush developer unit employs a magnetizable developer mix of carrier granules and toner particles. Each developer unit is arranged to form a directional flux field which continually creates a magnetic brush of developer mix. Each brush of developer mix is brought into contact with a corresponding latent image recorded on photoconductive surface 12. The toner particles adhering electrostatically to the carrier granules are attracted by the greater electrostatic force of the latent image, thereby rendering it visible. Developer units 30, 32 and 34, respectively, contain differently colored toner particles. Each of the toner particles contained in the respective developer unit correspond to the complement of the single color light image transmitted through each of the differently colored filters of filter mechanism 20. For example, a latent image formed from a green filtered light image is rendered visible by depositing green absorbing magenta toner particles thereon. Similarly, latent images formed from blue and red light images are developed with yellow and cyan toner particles, respectively.

After the latent image recorded on photoconductive surface 12 is developed, drum 10 rotates to transfer station D. At transfer station D, the toner powder image adhering electrostatically to photoconductive surface 12 is transferred to a sheet of support material 36. Support material 36 is secured releasably to a transfer roll, shown generally at 38. Transfer roll 38 is electrically biased to a potential of sufficient magnitude and polarity to electrostatically attract toner particles from photoconductive surface 12 to support material 36. Arrow 40 indicates the direction of rotation of transfer roll 38. Transfer roll 38 and drum 10 have the same tangential velocity. Thus, successive toner powder images may be transferred from photoconductive surface to sheet 36, in superimposed registration with one another. This produces a multi-layered toner powder image, each of the layers being of a different color. A suitable electrically biased transfer roll is described in U.S. Pat. No. 3,612,677 issued to Langdon et al. in 1971.

Prior to proceding with a description of the remaining processing stations, the sheet feeding path will be briefly described. Support material 36 is advanced from a stack 42 disposed upon a tray 44. Feed roller 46, in operative communication with retard roll 48, separates and advances the uppermost sheet from stack 42. The sheet moves into chute 50, which directs it into the nip of register rolls 52. Register rolls 52 align and forward the advancing sheet, in synchronism with the movement of transfer roll 38, to gripper finger 54 mounted thereon. Gripper finger 54 receives sheet 36 and secures it releasably on transfer roll 38. After the requisite number of toner powder images have been transferred to sheet 36, gripper fingers 54 space sheet 36 from transfer roll 38. As transfer roll 38 continues to rotate, stripper bar 56 is interposed between sheet 36 and transfer roll 38. This separates sheet 36 from transfer roll 38 positioning it on conveyor 58. Endless belt conveyor 58 moves a support material 36 to fixing station E.

At fixing station E, a fuser, indicated generally by the reference numeral 60, supplies sufficient heat to permanently affix the multi-layered toner powder image to support material 36. One type of suitable fusing apparatus is described in U.S. Pat. No. 3,907,492 issued to Draugelis et al. in 1975. After the fusing process, sheet 36 is advanced by belt conveyors 62 and 64 to catch tray 56 for subsequent removal therefrom by the machine operator.

Frequently, after the transfer of toner particles from photoconductive surface 12 to sheet 36, residual toner particles remain adhering thereto. These residual toner particles are removed as photoconductive surface 12 passes through cleaning station F. Cleaning station F, the final cleaning station in the direction of rotation of drum 10, includes a pre-clean corona generating device (not shown) for neutralizing the remaining charge on photoconductive surface 12 and that of the residual toner particles. This enables fibrous brush 68, in contact with photoconductive surface 12, to remove the residual toner particles therefrom. A suitable brush cleaning system is described in U.S. Pat. No. 3,590,412 issued to Gerbasi in 1971.

It is believed that the foregoing description is sufficient for purposes of the present application to describe the general operation of an electrophotographic printing machine incorporating the features of the present invention therein.

Figure 2:
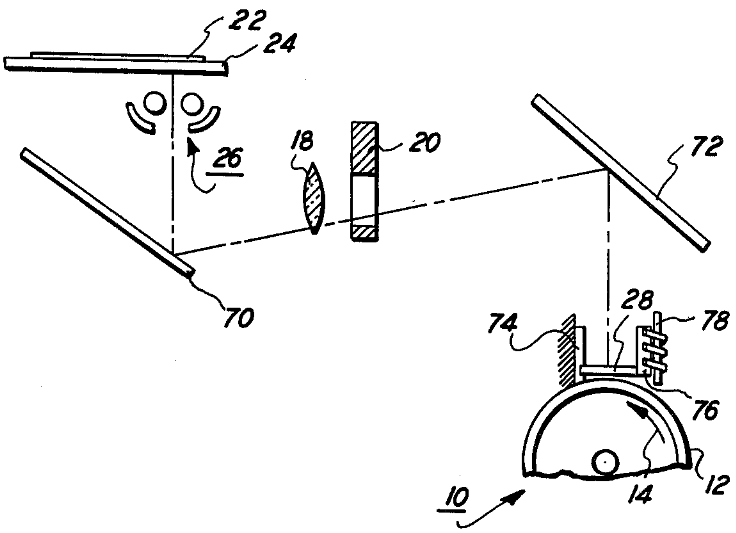
FIG. 2 is an elevational view showing the optical system employed in the FIG. 1 printing machine.
Figure 3:
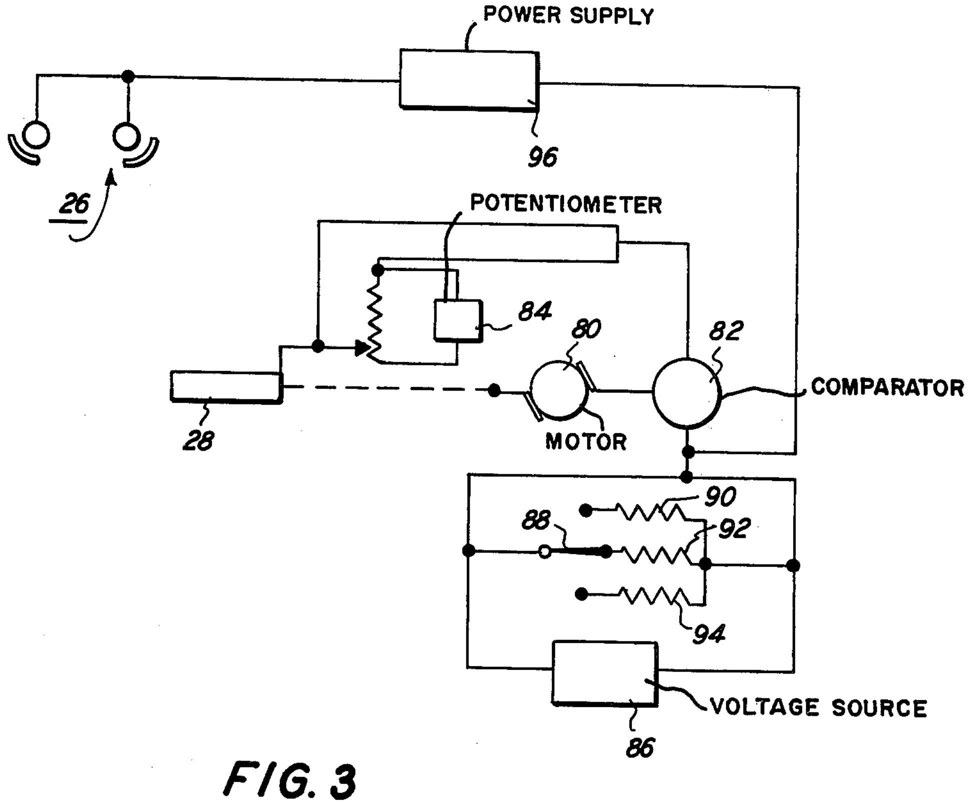
FIG. 3 is a schematic diagram illustrating the control system for regulating the intensity of illumination developed by the FIG. 2 optical system as a function of the spacing between the screen and photoconductive surface.

Referring now to FIG. 2, there is shown a schematic drawing of the optical system employed in the FIG. 1 printing machine. As shown thereat, lamps 26 move across platen 24 with original document 22 being disposed face down thereon. Light rays, reflected from original document 22, pass through transparent platen 24 onto mirror 70. Mirror 70 reflects the light rays through lens 18 to form a flowing light image thereof. The flowing light image is then transmitted through the appropriate filter of filter mechanism 20 to produce a single color flowing light image. This single color flowing light image is reflected by mirror 72 through screen member 28 forming a modulated single color flowing light image. This modulated single color flowing light image irradiates the charged portion of photoconductive surface 12. This selectively discharges the charge on photoconductive surface 12 recording a modulated single color electrostatic latent image thereon. Screen member 28 is mounted slideably in rail 74. Rack 76 is secured integral to screen member 28. Worm gear 78 meshes with rack 76. Thus, rotation of worm gear 78 translates rack 76. Translation of rack 76 moves screen 28 relative to photoconductive surface 12 to adjust the spacing therebetween. In this manner, contrast may be adjusted by moving member 28 to regulate the spacing between photoconductive surface 12 and screen member 28. In the functional mode of operation, the spacing may be increased to an optimum distance, de-focusing screen member 28, thereby rendering it ineffective. This is achieved by increasing the spacing between screen member 28 and photoconductive surface 12 a sufficient distance. However, as screen member 28 is moved, the spacing between photoconductive surface 12 and screen member 28 varies. This requires that the intensity of the light image transmitted through screen member 28 be suitably adjusted. The foregoing may be achieved by regulating the intensity of light rays generated by lamps 26. Thus, for any position of screen member 28, i.e., any spacing between screen member 28 and photoconductive surface 12, there is an optimum light ray intensity. The system for controlling both the movement of the screen member 28 and correspondingly controlling the intensity of the light rays developed by lamps 26 is depicted in FIG. 3.

Turning now to FIG. 3, there is shown the control system for regulating the intensity of the light rays generated by light source 26 as a function of the spacing between screen member 28 and photoconductive surface 12. As shown thereat, motor 80 is controlled by an error signal developed by comparator 82. Comparator 82 compares a reference signal with a signal indicating the position of screen member 28. In this manner, motor 80 moves screening member 29 until the error signal from comparator 82 is nulled. Screen member 28 is connected to the wiper arm of potentiometer 84. Movement of the wiper arm of potentiometer 84 adjusts the voltage output therefrom. In this way, potentiometer 84 provides an indication of the position of screen member 28 relative to photoconductive surface 12. The electrical output voltage from potentimeter 84 is transmitted to comparator 82. Voltage source 86 is connected to switch 88. Switch 88 is a rotary, three position, switch and connects any one of resistors 90, 92 or 94 to voltage source 86. In this way, the reference voltage applied to comparator 82 is adjustable and dependent upon the position of switch 88, i.e., which resistor is connected across source 86, for example, either resistor 90, 92 or 94. Simultaneously, the electrical output voltage transmitted to comparator 82 is also transmitted to power supply 96. This excites power supply 96 at the appropriate voltage which is variable as a function of the excitation voltage. Power supply 96 energizes lamps 26. Hence, it is evident that the reference voltage applied to comparator 82 is also applied to power supply 96. In this way, the operator dials both the position of screen member 28 and the voltage level energizing lamps 26. The operator accomplishes the foregoing by selecting the position of switch 88. This connects the corresponding resistor to voltage source 86. Hence, the reference voltage applied to comparator 82 and power supply 96 is suitably adjusted. Power supply 96 energizes lamps 26 at the appropriate intensity level. In addition, comparator 82 develops an error signal driving motor 80 to move screen member 28 until a coincidence signal is produced, i.e., the error signal is nulled. Thus, as screen member 28 is moved, adjusting the spacing between screen member 28 and photoconductive surface 12, the light ray intensity of lamps 26 is regulated.

By way of example, screen member 28 may be an 85 dot or line per inch screen. Preferably, the screen comprises a transparent substrate having the dots or lines formed thereon from a thin metal layer via chemical etching or other suitable techniques.

In recapitulation, it is evident that the control system of the present invention adjusts the spacing of the screen member 28 relative to photoconductive surface 12, while, simultaneously, regulating the intensity of the light rays illuminating the original document so as to optimize the resultant copy produced in the electrophotographic printing machine. The foregoing is achieved by employing an operator actuatable switch which varies the reference voltage applied to a positon servo mechanism for adjusting the location of the screen member. The reference voltage is also applied to the power supply energizing the light source illuminating the original document. Thus, the spacing between the photoconductive surface and the screen member is adjusted as the intensity of the light rays developed by the light source illuminating the original document is regulated. In this manner, the light source intensity is optimized for each screen position.

It is, therefore, apparent that there has been provided in accordance with the present invention an optical system wherein the light ray intensity is controlled as a function of screen position. This system fully satisfies the objects, aims and advantages hereinbefore set forth. While the specific invention has been described in conjunction with a specified embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An electrophotographic printing machine for reproducing an original document, including:

a photoconductive member;

means for charging at least a portion of said photoconductive member to a substantially uniform level;

a screen member;

means for adjusting the spacing between said screen member and said photoconductive member;

a light source for illuminating the original document;

a power supply coupled to said light source and applying an excitation voltage thereto;

means, responsive to the spacing between said scren member and said photoconductive member, for controlling said power supply to regulate the voltage applied to said light source by said power supply, thereby controlling the intensity of illuminating developed by said light source;

a lens is a light receiving relationship with the light rays transmitted from the original document to form a light image thereof; and means for directing the light image onto the charged portion of said photoconductive member to record an electrostatic latent image thereon.

2. A printing machine as recited in claim 1, further including means for filtering the light image transmitted through said lens to form a single color light image thereof.

3. A printing machine as recited in claim 1, wherein said controlling means includes switching means operatively associated with said power supply to set said power supply at one of a plurality of pre-selected levels.

4. A printing machine as recited in claim 3, wherein said adjusting means includes means for moving said screen member relative to said photoconductive member, said moving means locating said screen member at one of a plurality of positions relative to said photoconductive member in response to said switching means setting said power supply at one of a plurality of said pre-selected levels.

* * * * *